Jan. 13, 1931.    C. C. WILLIAMS    1,789,207
MECHANICAL MOVEMENT
Original Filed Aug. 6, 1925    4 Sheets-Sheet 1
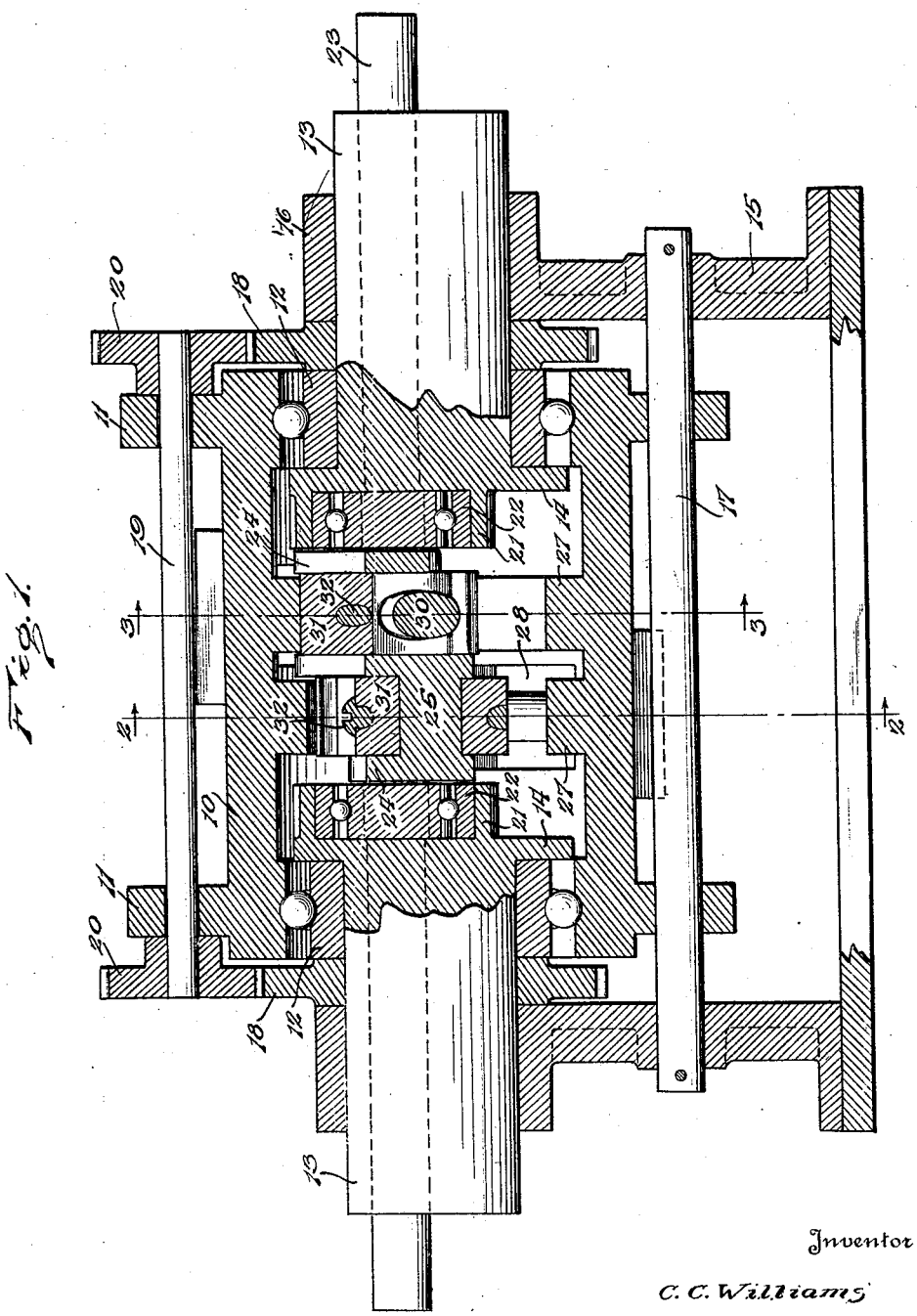
Inventor
C. C. Williams
By Lacy & Lacy, Attorneys Jan. 13, 1931.   C. C. WILLIAMS   1,789,207
MECHANICAL MOVEMENT
Original Filed Aug. 6, 1925    4 Sheets-Sheet 2
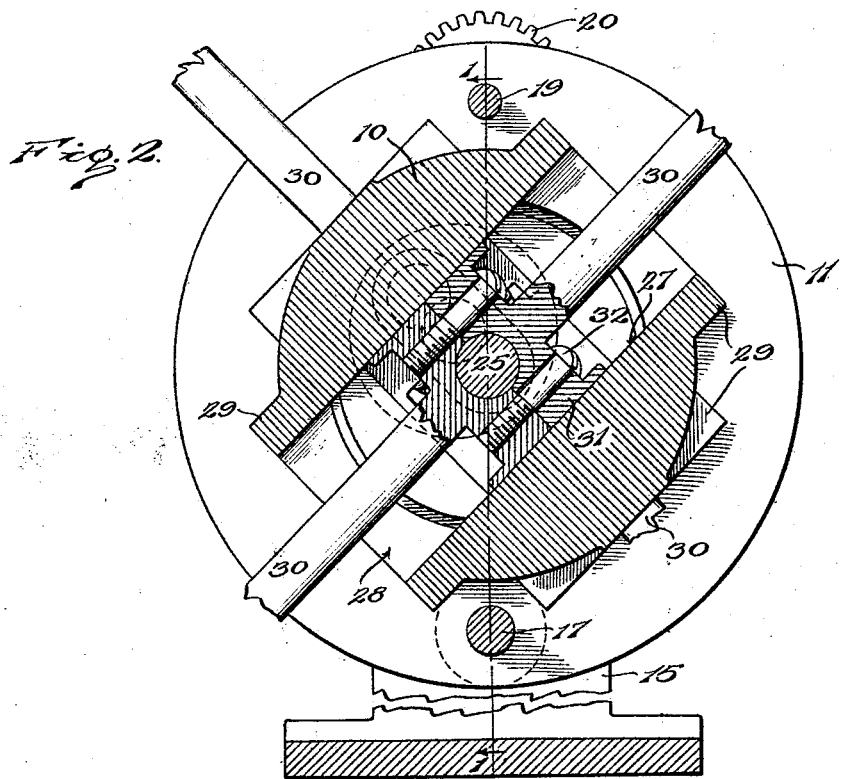
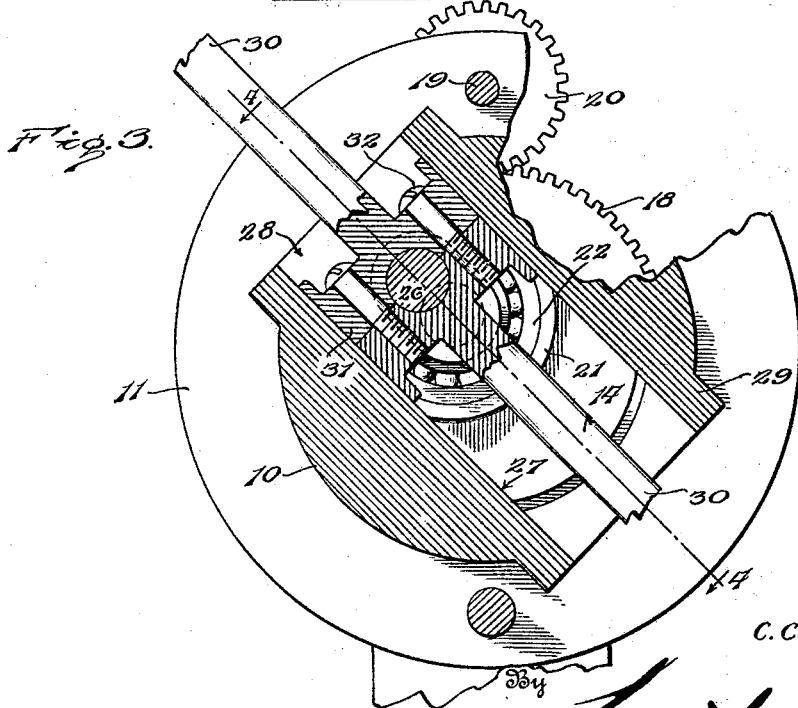

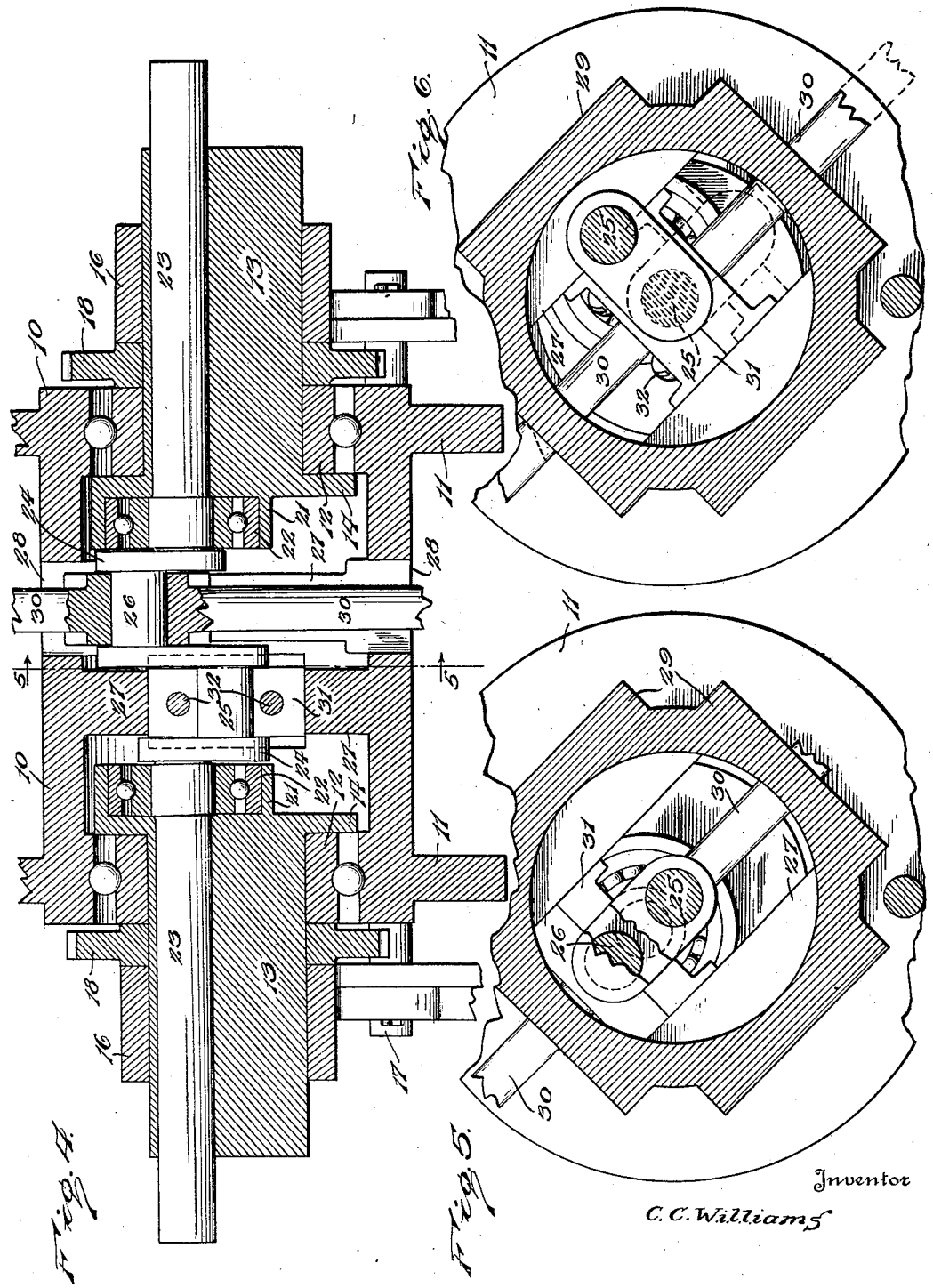

Jan. 13, 1931.  C. C. WILLIAMS  1,789,207
MECHANICAL MOVEMENT
Original Filed Aug. 6, 1925   4 Sheets-Sheet 4
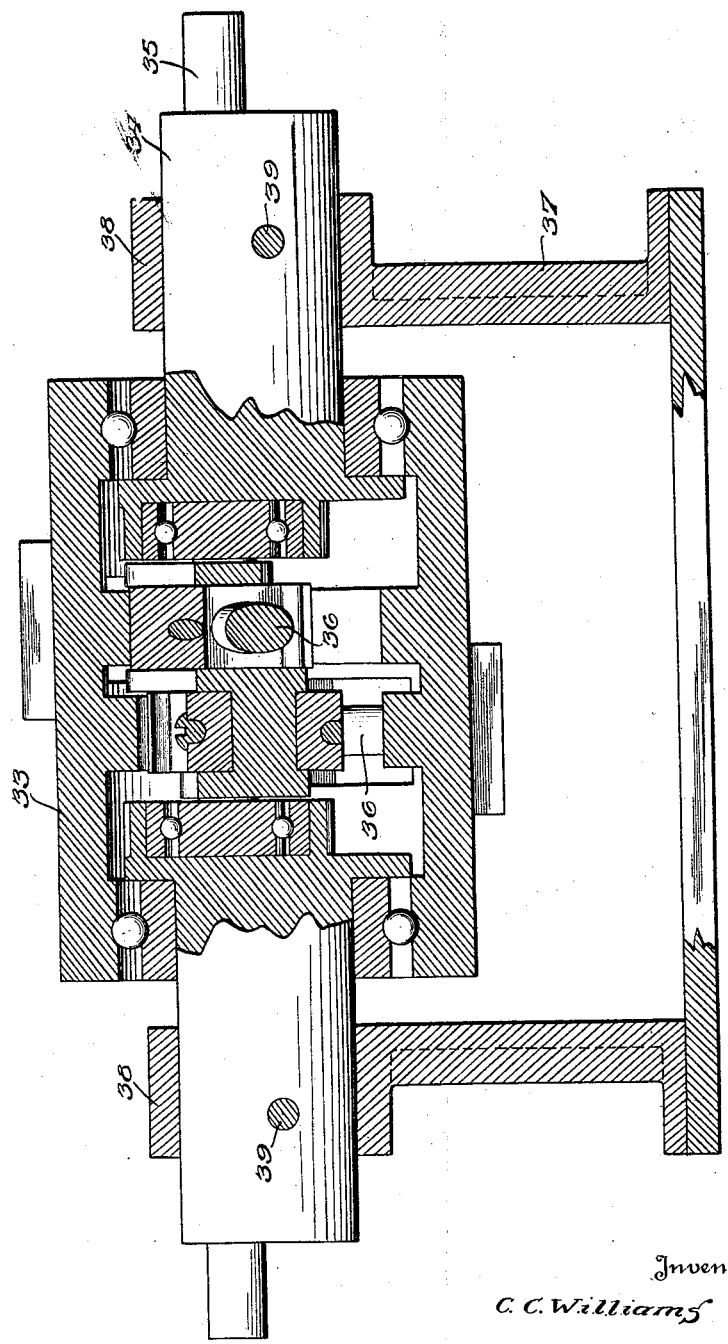
Inventor
C. C. Williams
By  Lacy & Lacy, Attorneys Patented Jan. 13, 1931

1,789,207

UNITED STATES PATENT OFFICE

CALVIN C. WILLIAMS, OF PHILADELPHIA, PENNSYLVANIA

MECHANICAL MOVEMENT

Refiled for abandoned application Serial No. 48,640, filed August 6, 1925. This application filed February 18, 1929. Serial No. 340,941.

This invention relates to an improved mechanical movement and seeks, among other objects, to provide a movement which, while being well adapted for general use wherever found applicable will, nevertheless, be especially applicable for use in connection with internal combustion engines for converting reciprocating motion into rotary motion.

The invention seeks, as a further object, to provide a mechanical movement whereby by mounting the crank shaft for individual movement in a circular path, the rectilinear throw will be doubled, whereby the piston stroke will be lengthened to twice the length of the crank of the crank shaft while, at the same time, the mechanism is rendered compact.

And the invention seeks, as a still further object, to provide a mechanical movement equally applicable for use in connection with rotary or reciprocating engines.

Other objects of the invention not specifically mentioned, will appear in the course of the following description.

This application is based on the same invention shown in my abandoned application for said invention filed August 6, 1925, Serial Number 48,640.

In the accompanying drawings:

Figure 1 is a vertical longitudinal sectional view on the line 1—1 of Figure 2, and showing my improved mechanical movement embodied in a machine as applicable to an internal combustion engine.

Figure 2 is a transverse sectional view on the line 2—2 of Figure 1, looking in the direction indicated by the arrows.

Figure 3 is a view similar to Figure 2, on the line 3—3 of Figure 1, looking in the direction indicated by the arrows.

Figure 4 is a longitudinal sectional view on the line 4—4 of Figure 3, looking in the direction indicated by the arrows.

Figure 5 is a transverse sectional view on the line 5—5 of Figure 4, looking in the direction indicated by the arrows.

Figure 6 is a view similar to Figure 5, and showing, in dotted lines, the rectilinear movement of the crank pins.

Figure 7 is a vertical longitudinal sectional view showing the invention embodied in a machine as applicable to a rotary engine.

Referring now more particularly to Figures 1 to 6 inclusive of the drawings, I have shown the present improvements embodied in a machine as applicable to a four-cylinder engine. However, I do not wish to be limited in this respect since the invention is equally applicable for use in connection with engines having either a greater or less number of cylinders. The numeral 10 indicates a cylindrical casing which is provided near its ends with annular flanges 11 and mounted in the ends of the casings are ball bearings 12. Journaled through said bearings axially of the casing are companion alined stub shafts 13 which are provided at their inner ends with annular flanges 14 to abut the bearings 12 at their inner sides for limiting said shafts against outward displacement, and mounting said shafts are supports 15 which are provided at their upper ends with bearings 16 journaling the shafts 13. Extending through said supports and through the flanges 11 of the casing 10 at the lower side thereof is a cross rod 17 locking the casing against rotation, and fixed to the shafts 13 between the ends of the casing and the bearings 16 of said supports are gears 18. Journaled through the flanges 11 of the casing at the upper side thereof is a cross shaft 19 and fixed to the ends of said shaft are pinions 20 meshing with the gears 18 for coupling the shafts 13 with each other to turn in unison. Formed on the inner ends of the stub shafts 13 in eccentric relation to the longitudinal axes of said shafts are annular flanges 21 providing sockets in which are fixed ball bearings 22, and journaled through said bearings to extend freely through suitable openings in the stub shafts 13 is a crank shaft 23 having cranks 24 carrying crank pins indicated for convenience at 25 and 26. The crank pins are opposed or, in other words, lie in the same plane, and the effective length of each of the cranks 24 is equal to the distance the crank shaft is eccentrically disposed with respect to the axes of the stub shafts 13.

Accordingly, when the stub shafts are caused to revolve, the crank shaft will travel in a circular path and will partake of a throw equal to the throw of the crank pins respectively.

Extending within the casing 10 are pairs of cross head guides 27 which may be integral with the casing and lie in radial planes disposed at a right angle to each other. At the ends of said pairs of guides, the casing is provided with openings 28 and formed on the casing to surround said openings are bosses 29 to which engine cylinders may be attached, the bosses being provided with flat faces to seat said cylinders. Connected to the crank pins 25 and 26 are pairs of oppositely extending alined piston rods 30 extending freely through the pairs of openings 28. At their inner ends, these rods are formed with mating bearing portions which fit about the crank pins 25 and 26 and are formed to provide cross heads 31 slidable between the pairs of guides 27. Securing the bearing portions of each cross head together are cap bolts 32. Thus, the piston rods are operatively connected with the crank shaft and, as will be perceived, the cross heads 31 will cooperate with the guides 27 for limiting the crank pins 25 and 26 to rectilinear movement in planes radial to the crank shaft. Suitable pistons may be connected in any appropriate manner to the outer ends of the piston rods for reciprocation in the cylinders attached to the bosses 29 of the casing 10.

As will now be seen in view of the foregoing, when the piston rods 30 are caused to reciprocate, the thrust on the crank pins 25 and 26 will, since said pins are limited against travel in a circular path, be communicated to the crank shaft 23 and consequently to the stub shafts 13 for causing said stub shafts to rotate. Rotation of the stub shafts will effect the travel of the crank shaft in a circular path about the axes of said stub shafts, with the result that the rectilinear throw of the crank pins will be accommodated by the eccentric throw of the crank shaft so that the crank pins may travel in straight lines as the crank shaft revolves about the axes of the stub shafts. Furthermore, since the eccentric throw of the crank shaft is equal to the effective length of the cranks, as previously noted, the eccentric throw of the crank shaft will serve to double the crank pin throw with a corresponding increase in length of piston stroke for any given crank length. Figure 2 shows the crank pin 25 at the middle of its stroke in one direction, at which time the crank pin 26 is, as shown in Figure 3, at one end of its stroke ready to return in the opposite direction. Figure 5 shows the relative disposition of the crank pins at such time while Figure 6 shows, by full section lines and dotted sections, the typical rectilinear travel of one of the crank pins.

In Figure 7 of the drawings, I have illustrated the present improvements embodied in a machine adapted to a rotary engine. A casing 33 is employed. This casing is identical with the casing 10 with the exception that the flanges 11 of the latter casing are eliminated. The cross rod 17, the gears 18, cross shaft 19, and pinions 20, as illustrated in the prior embodiment of the invention, are also eliminated. Extending at the ends of the casing 33 are stub shafts 34 identical with the shafts 13 and extending through the shafts 34 is a crank shaft 35 identical with the crank shaft 23. Connected with the crank shaft are piston rods 36 corresponding to the piston rods 30, and mounting the stub shafts 34 are supports 37 which are similar to the supports 15 and are provided at their upper ends with bearings 38 journaling the stub shafts. Extending through the stub shafts and through said bearings are pins 39 locking the stub shafts against rotation. Otherwise, this embodiment of the invention is identical with the prior embodiment and, as will be perceived, in view of the foregoing description, when thrust is applied to the piston rods 36, the casing 33 will be caused to revolve about the stub shafts 34.

Having thus described the invention, what I claim is:

1. In a mechanical movement, a casing having cross head guides arranged in angularly disposed planes, stub shafts journaled on the casing, a crank shaft journaled on the stub shafts eccentrically thereof and having crank pins, cross heads connected with said pins and movable between said guides for directing said pins each in a rectilinear path and rotating said stub shafts to accommodate the rectilinear movement of said pins, and additional means connecting the stub shafts to turn in unison.

2. In a mechanical movement, a casing having cross head guides arranged in angularly disposed planes, stub shafts journaled on the casing, a crank shaft journaled on the stub shafts eccentrically thereof and having crank pins, cross heads connected with said pins and movable between said guides for directing said pins each in a rectilinear path and rotating said stub shafts to accommodate the rectilinear movement of said pins, gears on the stub shafts, a cross shaft, and pinions carried by the cross shaft and meshing with said gears for connecting the stub shafts to turn in unison.

In testimony whereof I affix my signature.

CALVIN C. WILLIAMS. [L. S.]